United States Patent [19]
Norris

[11] Patent Number: 4,619,559
[45] Date of Patent: Oct. 28, 1986

[54] ROCK BOLTING

[75] Inventor: Colin Norris, Tarro, Australia

[73] Assignee: The Titan Manufacturing Co. Pty. Ltd., New South Wales, Australia

[21] Appl. No.: 723,554

[22] Filed: Apr. 15, 1985

Related U.S. Application Data

[63] Continuation of Ser. No. 622,858, Jun. 21, 1984, abandoned, which is a continuation of Ser. No. 417,945, Sep. 14, 1982, abandoned, which is a continuation of Ser. No. 214,895, Dec. 9, 1980, abandoned.

[51] Int. Cl.⁴ .................. E21D 21/00; F16B 43/00
[52] U.S. Cl. ............................ 405/259; 411/531; 411/534
[58] Field of Search .............. 405/259, 288; 411/531, 411/534, 537, 538, 542, 907, 908

[56] References Cited

U.S. PATENT DOCUMENTS

| 2,731,065 | 1/1956 | Powers | 411/531 |
| 3,144,803 | 8/1964 | Briles | 411/531 |
| 3,422,721 | 1/1969 | Yonkers | 411/538 X |
| 4,052,860 | 10/1970 | Alterman | 405/259 |
| 4,183,699 | 1/1980 | Donan | 405/259 |
| 4,362,449 | 12/1982 | Hlinsky | 411/531 X |

FOREIGN PATENT DOCUMENTS 1403030  5/1965  France ........................ 411/538

Primary Examiner—Cornelius J. Husar
Assistant Examiner—Nancy J. Stodola
Attorney, Agent, or Firm—Murray and Whisenhunt

[57] ABSTRACT

A rock bolt assembly incorporating a friction reducing washer of plastics material between the nut and the plate washer to give an increased tension in the bolt for a given torque.

14 Claims, 4 Drawing Figures

ROCK BOLTING

This application is a continuation, of Ser. No. 622,858, filed June 21, 1984, now abandoned, which was a continuation of Ser. No. 417,945, filed Sept. 14, 1982, now abandoned, which was a continuation of Ser. No. 214,895, filed Dec. 9, 1980, now abandoned.

This invention relates to an improved rock bolting method and has been devised particularly though not solely to enable a user to induce a higher tension in a rock bolt than is the normal practice or to enable rock reinforcing roof bolts to be tightened to a desired tension using low torque machines.

In the installation of rock and roof bolts two basic types of bolting machines are utilized—high torque machines, either as mobile units or rigs attached to other machines (in some cases torque multipliers on portable machines) which can deliver up to 250 foot-pounds torque, or lower torque machines either air driven, electrically driven or hydraulically driven portable machines capable of delivering 60 to 80 foot-pounds torque. The method of installation of a roof bolt generally involves a tensile loading of the bolt during installation. This loading is usually performed in practice by tightening the nut to a set torque (from past guide lines) thus inducing tension in the bolt. The set torque to give a resultant expected load uses specific assumptions on the friction in the roof bolt assembly and generally cannot be attained by the use of a low torque machine, i.e. the required torques to achieve the desired tensions in the roof bolts are frequently such that the user of a low torque machine cannot induce the required tension.

It is therefore an object of the present invention to provide a rock bolt assembly which will obviate or minimise the foregoing disadvantages in a simple yet effective manner.

Accordingly, in one aspect the invention consists in a rock bolt assembly comprising a bolt having one end adapted to be anchored in a hole drilled in a rock face and the other end threaded, a plate washer having a hole therethrough sized to fit over said threaded end, a nut adapted to engage said threaded end, and a friction reducing washer adapted to be placed between said plate washer and said nut, said friction reducing washer being made of a material having a lower coefficient of friction with either one of said flat washer or said nut than the coefficient of friction between said flat washer and said nut.

Preferably said friction reducing washer is made of a suitable plastics material.

In a further aspect the invention consists in a method of reinforcing a rock face with one or more rock bolts, said method comprising the steps of drilling a hole in said rock face, inserting a rock bolt into said hole so that the threaded free end thereof protrudes from the hole, anchoring the other end of the bolt into the hole, placing a plate washer over said free end of said bolt, placing a friction reducing washer over said free end of said bolt, engaging a nut with said threaded free end, and tightening said nut to force said plate washer against said rock face and induce a tension in said bolt, wherein said friction reducing washer is made of a material having a lower coefficient of friction with either one of said flat washer or said nut than the coefficient of friction between said flat washer and said nut.

Notwithstanding any other forms that may fall within its scope, one preferred form of the invention will now be described with reference to the accompanying drawings, in which.

Figure 4:
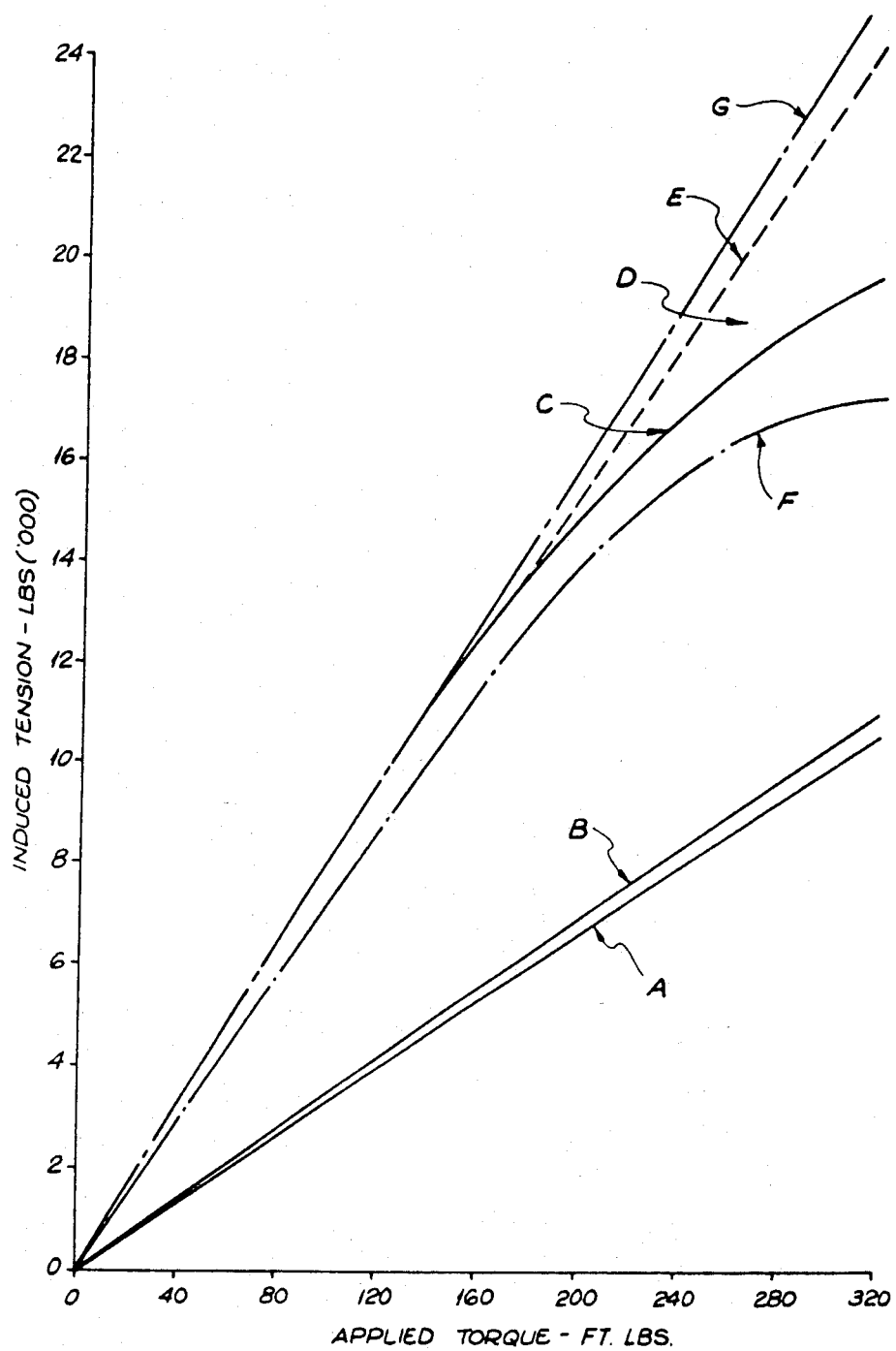
FIG. 4 is a graph of the torque applied to the nut of a rock bolt assembly against the tension induced in the bolt for a rock bolt assembly according to the invention, and also for a conventional prior art rock bolt.

The present invention stems from laboratory analysis of the source of friction in a rock bolting assembly. It was previously assumed that the principle friction in a rock bolt assembly occurred in the thread system, i.e. between the female thread in the nut and the male thread on the bolt. Reference to FIG. 4 and in particular to line "A" shows the tension which is induced in a conventional prior art rock bolt upon application of various torque loadings. Line "B" shows similar characteristics in which the nut has been greased before engagement with the bolt. It will be apparent from these figures that there is very little increase in tension in the bolt at a given torque induced by greasing the nut, and from this it was deduced tht the principle source of friction which limited the tension in the bolt at a given torque figure occurred at the nut/washer interface. Experimentation was then carried out with the nut face and plate washer greased which gave greatly improved results, and plastics intermediate washers were later used because of their low coefficient of friction (plastics to steel) and the advantage that dirt contaminants would have little effect when compared with similar contamination of a greased surface.

Figure 1:
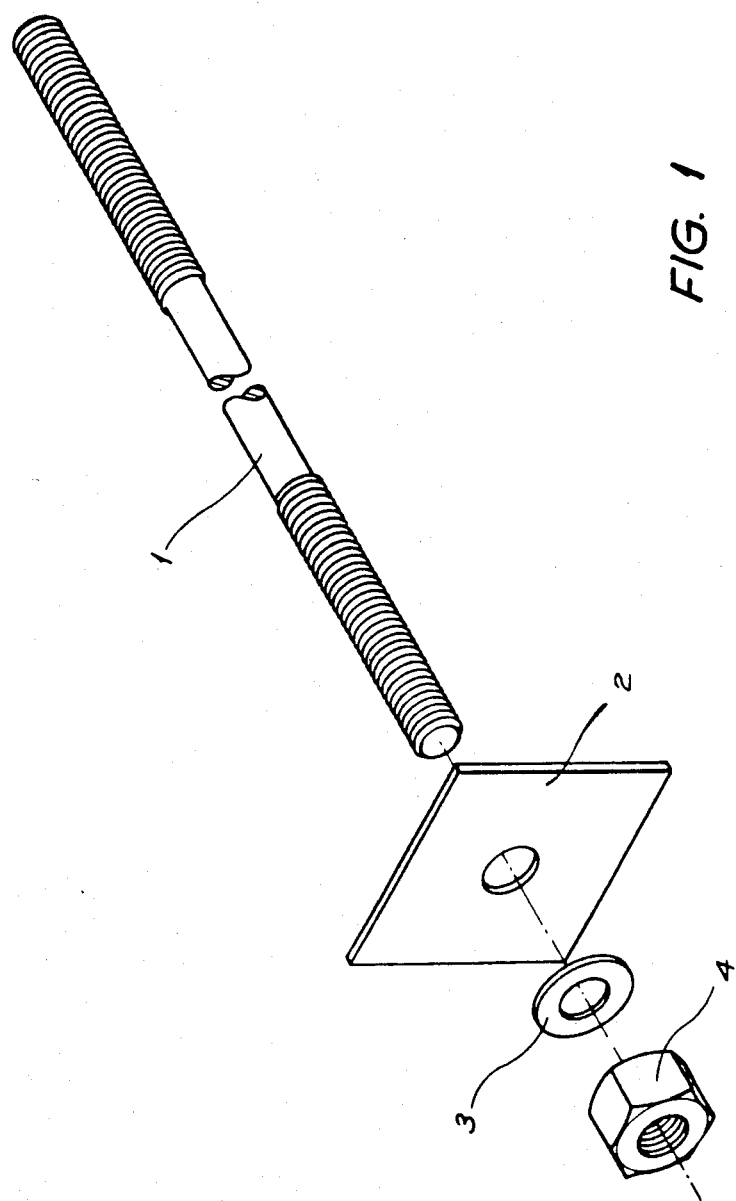
FIG. 1 is a perspective view of a rock bolt assembly according to the invention.

The form of invention which was developed is shown in FIG. 1 in which the bolt is shown at 1 having one end adapted to be anchored in a hole drilled in a rock face, e.g. by chemical mixing or by any other form of anchoring commonly known for use with rock bolts. A plate washer 2 is provided having a hole through the washer sized to fit over the threaded end of the bolt and a nut 4 is used to engage with the threaded end of the bolt to tighten the rock bolt assembly. The plastics washer 3 which is interposed between the interface of the nut 4 and the plate washer 2 may take a number of forms and is shown in FIG. 1 as a simple flat washer.

Figure 2:
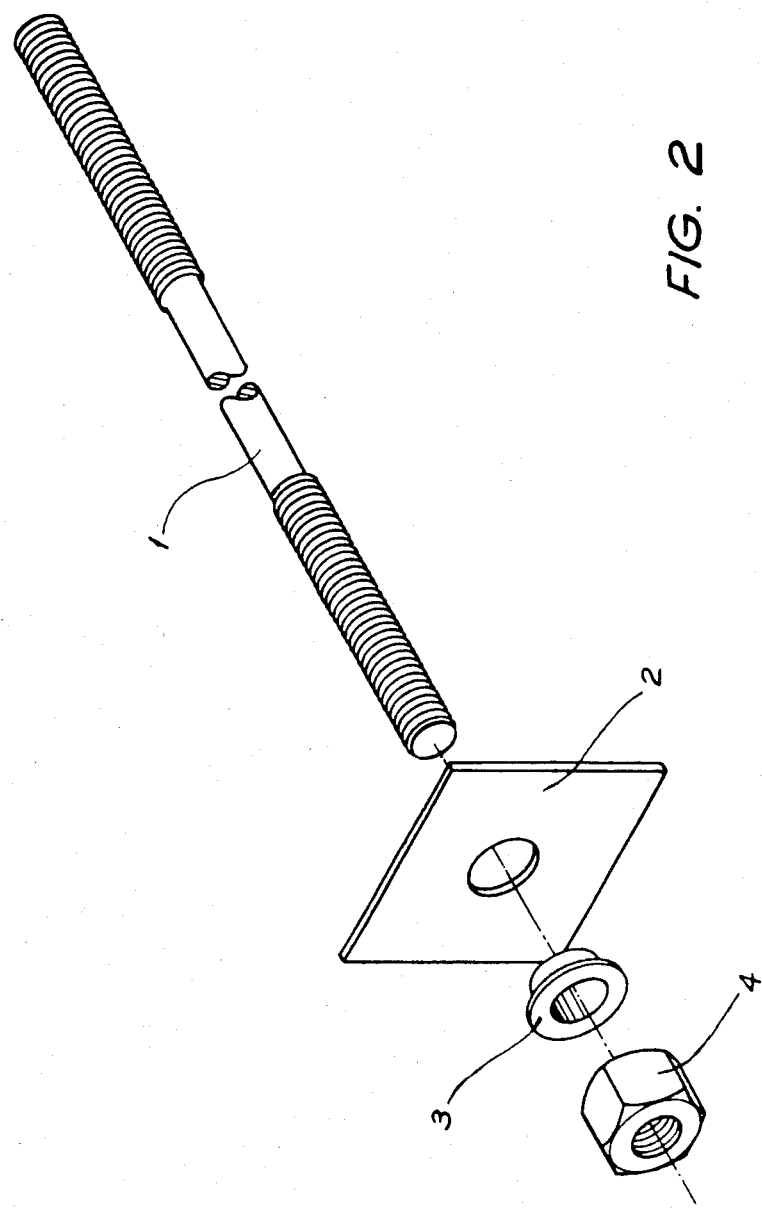
FIG. 2 is a perspective view of an alternative form of rock bolt assembly according to the invention.
Figure 3:
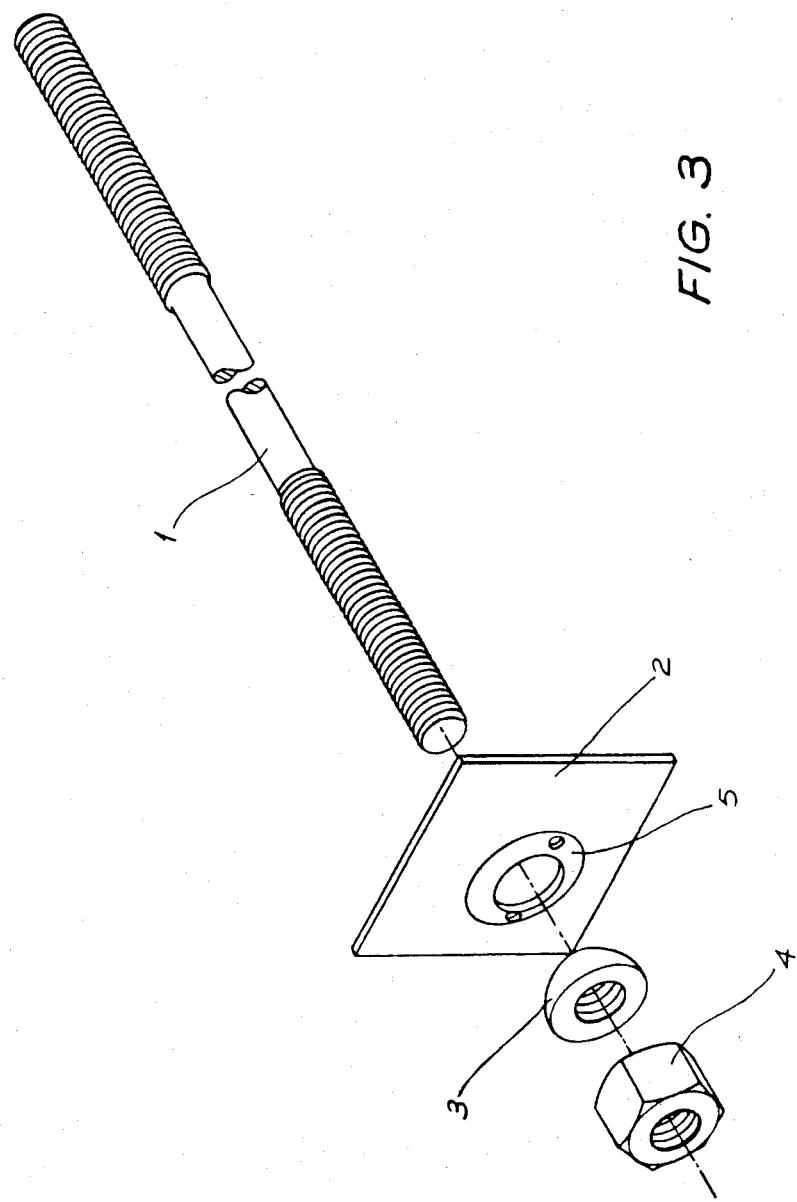
FIG. 3 is a perspective view of yet another alternative form of rock bolt assembly according to the invention.

Alternative forms of the plastics washer are shown in FIGS. 2 and 3 in which like reference numerals refer to like components as for FIG. 1. In the configuration shown in FIG. 2 the plastics washer is shaped to fit through a larger hole in the steel plate washer. This has the added advantage of protecting the bolt thread from damage caused by the plate washer on installation. FIG. 3 shows a plastics ball washer placed between the plate washer and the nut. The rounded portion of the ball washer engages with the out-turned edge of the hole in the flat washer which has a portion 5 domed outwardly toward the ball washer and nut. This configuration has the advantage that considerable misalignment between the axis of the hole and the flat washer can be tolerated, i.e. the plane of the flat washer 2 need not be at right angles to the axis of the bolt 1. In an alternative form of this configuration the ball washer may be formed from cast iron or any other suitable material and a flat plastics washer such as that shown at 3 in FIG. 1 may be placed between the flat surface of the ball washer and the face of the nut.

The performance of a rock bolting assembly according to the invention will now be described with reference to FIG. 4 where lines F and G show the limits of performance of the assembly over an area D between these lines and line C is the "best fit" line for the results from this area. Line E shows a plastics washer used in conjunction with a greased thread.

It can be seen from FIG. 4 that when the plastics washer is used with a rock bolt a much higher induced tension is achieved for a given applied torque. Roof bolts with a plastics intermediate washer have a tension to torque ratio of 80 up to an applied torque of 160 foot-pounds, and 70 at 240 foot-pounds compared to a ratio of 33 in the prior art rock bolts shown on lines A and B. In this ratio the higher the number, the lower the inherent friction in the system. It can be seen that the tightening efficiency has been improved 2.35 times in the torque range up to 100 foot-pounds and over 2 times at the higher torque range.

The washer 3 can be made of any suitable plastics material having a low coefficient of friction but in the preferred form of the invention the washer is formed from either polypropylene or polyethylene. The material thickness of washers used to obtain the test figures shown in FIG. 4 was 1–1.5 mm, the outside diameter of the washer was 1.6 D, and the inside diameter of 1.04 D, where D is the thread diameter. It is desirable to keep the material thickness of the plastics washer to sizes of this order so that the washer is thin enough to partially melt under the load of the applied torque and reduce the coefficient of friction.

In this manner a rock bolt assembly is provided which enables the required tension to be induced in the bolt by the use of portable low torque machines which therefore enables simpler quicker and cheaper installation of the rock bolts. The invention also enables a user to induce a higher tension in a rock bolt than is the normal practice where this is required.

What I claim is:

1. In a method of reinforcing a rock face with at least one rock bolt, said method comprising:
   drilling a hole in the rock face,
   inserting a rock bolt having at least one threaded end into the hole so that a threaded free end thereof protrudes from the hole,
   anchoring the other end of the rock bolt into the hole,
   placing a plate washer over the threaded free end of the bolt,
   engaging a nut with the threaded free end, and
   tightening the nut to force the plate washer against the rock face to induce a tension in the rock bolt,
   the improvement comprising:
   reducing the coefficient of friction between the plate washer and the nut by placing a friction-reducing disc over the free end of the rock bolt before the nut is engaged therewith, so that the friction-reducing disc is located between the plate washer and the nut, wherein the friction-reducing disc is made of a material having a lower coefficient of friction with at least one of the plate washer and the nut than the coefficient of friction between the plate washer and the nut.

2. Method of claim 1, wherein the tension (in thousands of pounds) to torque (in foot-pounds) ratio is generally at least 70.

3. Method of claim 2, wherein said ratio is about 70 to about 80.

4. Method of claim 1, wherein the nut tightening efficiency is improved by a factor of at least two over the rock bolt assembly with nothing between the plate washer and the nut.

5. Method of claim 1, wherein said friction-reducing disc is made of a plastics material.

6. Method of claim 5, wherein said friction-reducing disc is made of a member selected from the group consisting of polypropylene and polyethylene.

7. Method of claim 1, wherein said friction-reducing disc is in shape of a substantially planar disc.

8. A rock bolt assembly comprising a rock bolt having one end adapted to be anchored in a hole drilled in a rock face and the other end threaded, a plate washer having a hole therethrough sized to fit over the threaded end of the rock bolt, a nut adapted to engage the threaded end of the rock bolt, and a friction-reducing disc means adapted to be placed between the plate washer and the nut for reducing the coefficient of friction between the plate washer and the nut by being of the material having a lower coefficient of friction with at least one of the plate washer and the nut than the coefficient of friction between the plate washer and the nut.

9. Assembly of claim 8, wherein said friction-reducing disc means is made of a plastics material.

10. Assembly of claim 9, wherein said plastics material is selected from a group consisting of polyethylene and polypropylene.

11. Assembly of claim 8, wherein said friction-reducing disc means is a substantially planar disc.

12. Assembly of claim 8, wherein said friction-reducing disc means has a thickness in the order of from 1.0 to 1.5 mm.

13. In a method of reinforcing a rock face with at least one rock bolt, said method comprising:
   drilling a hole in the rock face,
   inserting a rock bolt having at least one threaded end into the hole so that a threaded face end thereof protrudes from the hole,
   anchoroing the other end of the rock bolt into the hole,
   placing a plate washer over the threaded free end of the bolt,
   engaging a nut with the threaded free end, and
   tightening the nut to force the plate washer against the rock face to induce a tension in the rock bolt,
   the improvement comprising
   reducing the coefficient of friction between the plate washer and the nut by placing a friction reducing disc over the free end of the rock bolt before the nut is engaged therewith, so that the friction reducing disc is located between the plate washer and the nut, wherein the friction reducing disc is made of a material having a lower coefficient of friction with at least one of the plate washer and the nut than the coefficient of friction between the plate washer and the nut
   and then further reducing the coefficient of friction of the friction reducing disc with either one of the plate washer or the nut by partially melting the friction reducing disc under the applied torque upon tightening of the nut to produce a much higher induced tension in the rock bolt for a given applied torque.

14. A rock bolt assembly comprising a rock bolt having one end adapted to be anchored in a hole drilled in a rock face and the other end threaded, a plate washer having a hole therethrough sized to fit over the threaded end of the rock bolt, and friction-reducing disc means adapted to be placed between the plate washer and the nut for initially reducing the coefficient of friction between the plate washer and the nut by being of a material having a lower coefficient of friction with at least one of the plate washer and the nut than the coefficient of friction between the plate washer and the nut, and for further reducing the coefficient of friction in the area between the plate washer and the nut by partially melting under the applied torque upon tightening of the nut to produce a much higher induced tension in the rock bolt assembly for a given applied torque.

* * * * *